(No Model.)

M. H. NASH.
MOLE TRAP.

No. 529,801.          Patented Nov. 27, 1894.

Witnesses:          Inventor,

UNITED STATES PATENT OFFICE.

MYRON H. NASH, OF KALAMAZOO, MICHIGAN.

MOLE-TRAP.

SPECIFICATION forming part of Letters Patent No. 529,801, dated November 27, 1894.

Application filed April 5, 1894. Serial No. 506,423. (No model.)

*To all whom it may concern:*

Be it known that I, MYRON H. NASH, a citizen of the United States, residing at the city of Kalamazoo, in the county of Kalamazoo and State of Michigan, have invented certain new and useful Improvements in Mole-Traps, of which the following is a specification.

My invention relates to animal traps, more particularly to animal traps adapted to catch moles or animals of similar habits, such as gophers. Heretofore traps designed for entrapping moles have usually depended on means of forcing a spear through the ground above the burrow into the mole and capturing him in that way. Others have been constructed to catch the animal in a loop by means of adjusting the loop in the burrow and affording a trip or pan to spring the trap, and have brought some part of the trip mechanism into the opening of the burrow which usually has the effect to cause the mole to discover the danger and escape it.

The objects of my invention are to provide a mole trap that shall not depend on any parts projecting into the burrow to operate the same; also to provide a trap which, when in position, will be buried in the earth away from the burrow so that there is very little danger of its being discovered; and further to provide a trap which shall be easy to adjust and set in the manner I have mentioned above. I accomplish these objects by the device shown in the accompanying drawings, in which—

Figure 1:
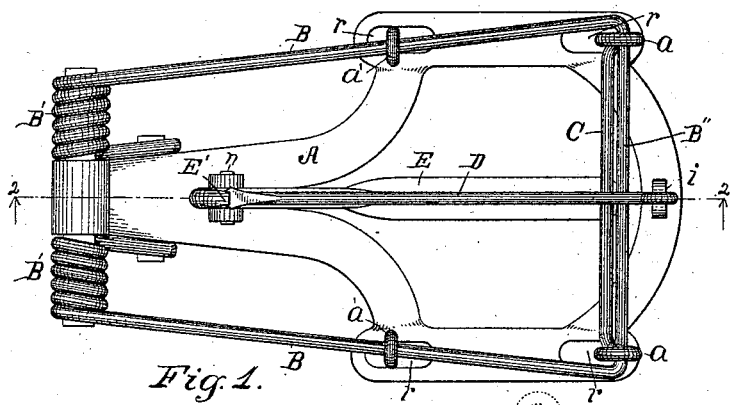
Figure 2:
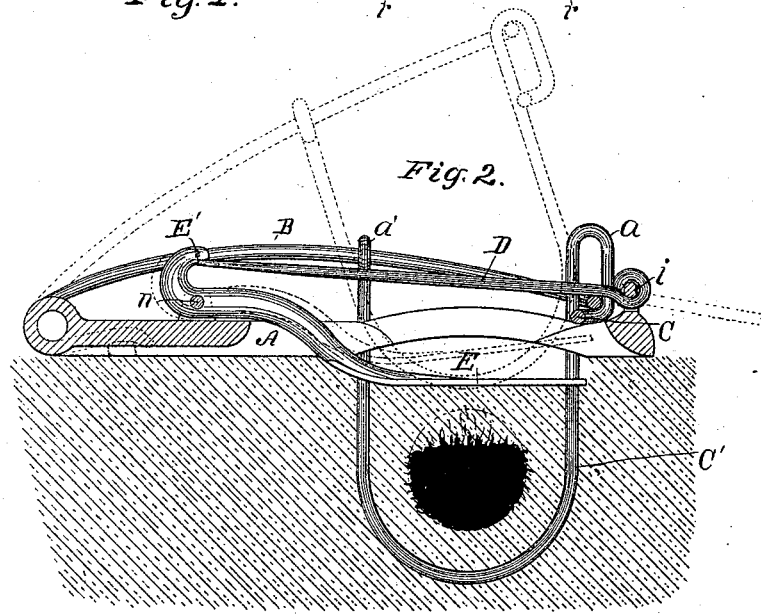
Figure 3:
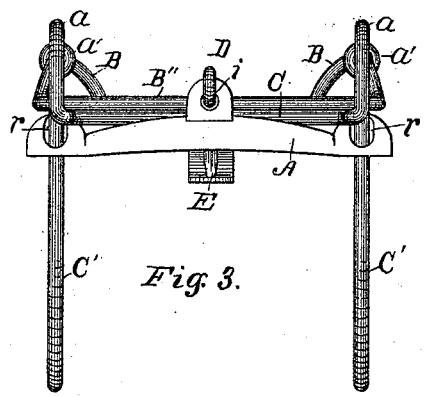

Figure 1 is a top plan view of my improved trap, set ready to be sprung. Fig. 2 is a sectional view on line 2—2 of Fig. 1 showing the position of the trap in the earth in relation to the mole's burrow showing its appearance when set and the dotted lines showing the position when the trap is sprung. Fig. 3 is a front elevation of Fig. 1 showing the position of parts.

Similar letters of reference refer to similar parts throughout the several views.

A is the main frame of my improved trap which I prefer to have constructed of cast iron, although it may be constructed of any other suitable material. The main part of the frame is substantially rectangular in form with an open space at the center. A shank-like portion extends to one side from the rectangle and holds the cross-piece, A'. Elongated, small openings, $r$, are near each corner of the rectangular portion and are parallel with each other. Loops, C', are formed, preferably of spring wire, and are curved so that the ends of the loops project up through the openings, $r$, $r$. The loops, C', are both constructed of one piece of wire which is curved into small ear-like loops at the upper front side and bent down and connected across by the cross-portion, C. The loops, C', terminate at each end in small loops, $a'$, at the upper side of the trap, the loops, C', being on the lower side. The spring wires, B, are coiled into coils, B', the ends of which wires engage lugs on the side of the main frame, A. The wires, B, extend forward to the front of the trap through the loops, $a'$, $a'$, and the portion, B'', extends across the front of the trap and through the loops, $a$, of the wire, C. Tension is put on the spring wires, B, to tend to throw them up which (as will be seen by dotted lines in Fig. 2) brings the loop, C', up tight against the under side of the main frame, A, the openings, $r$, $r$, serving as guides.

The trip or pan, E, of the trap is pivoted at $n$ to the shank portion of the main frame. It is flattened at its outer end. To the front portion of the trap is pivoted an arm, D, at $i$ which is adapted to hold the trap set in position until it is released by disturbing the pan or pedal, E. The end of the lever, D, is adapted to a catch, E', at the end of the pan, E, where it holds until the pan, E, is disturbed.

In using my improved mole trap, it is set on the burrow or trail of the ordinary ground mole by pressing the dirt slightly so that it partially or wholly closes the burrow at that point. The trap is set and the loops, C', pressed down past the burrow to each side of the depressed portion so that the loops surround the open part of the burrow, or what would be the open part of the burrow had it not been pressed or closed. The pan or pedal, E, is pressed into the soil sufficiently so that the catch, E', will retain the lever, D. When in this position, as will be readily seen, the mole or other burrowing animal attempting to pass through the burrow will find it closed, or partially closed, as the case may be, and in crowding through it the soil will be crowded slightly up when the pedal, E, will be moved which will release the catch and spring the trap and capture the animal between either one or the other of the loops, C', and the main frame of the trap.

Having thus described my invention, I desire to say that it is capable of considerable variation in its construction. The form of the main frame can be varied to suit the taste or fancy of the builder or user, and other springs can be used and answer the purpose than the spring wires, B, but I prefer the trap constructed as I have indicated and have found it very effective for the purpose; in fact, very much more so than any traps of the kind that I have ever known or used.

Having thus described my invention, what I claim as new, and desire to secure by Letters Patent, is—

1. In a trap, the combination of the main frame, A, with a rectangular portion having a central opening, and the cross-portion, A'; loops, C', C', to each side of the rectangular portion, the ends of which pass through guiding openings, r, r, in the main frame; a spring wire, B, coiled on the cross-portions, A', at B', B', with a cross-portion, B'', connecting the forward ends of said spring; elongated loops, a, at the ends of the large loop, C', to the upper side of the frame, A, for the passage of the cross-wire, B''; a loop, a', at the opposite ends of the large loops, C', to engage the spring wires, B; a pan or trip, E, to be moved or tripped by the motion of the soil caused by the burrowing animal centrally located in the opening of the rectangular portion of the frame, and pivoted at n to the main frame; and a lever, D, pivoted at i to the front part of the frame and adapted to engage the catch, E', on the pedal or pan, E, all substantially as described and for the purpose specified.

2. In a mole trap, the combination of the main frame consisting of a substantially rectangular portion open at its center with a shank-like portion projecting to one side; large spring loops projecting below said main frame, and in suitable guides therein; a spring attached to the shank portion of the main frame to actuate said loops; a catch to retain said loops, depressed; and a suitable pan or trip toward the center of the rectangular opening to be operated by the motion of the soil caused by the animal passing to release the trap, for the purpose specified.

3. In a mole trap, the combination of a main frame, the loops projecting below said frame and adapted to be forced into the ground below the burrow of the animal; a spring to actuate said loops and pull them tight toward the main frame; suitable means for holding said spring depressed; and a trip to rest upon the ground between the loops to be actuated by the movement of the soil caused by the animal from beneath, to release the trap, for the purpose specified.

4. In a mole trap, the combination of the main frame, loops projecting below said frame and adapted to be forced into the ground below the trail of the mole; suitable means of actuating said loops; a pedal between said loops resting on the ground above, adapted, when the ground is disturbed, by the movement of an animal beneath, to release the operating mechanism to throw the loops up against the main frame, for the purpose specified.

5. In a mole trap, the combination of the main frame; a loop projecting below said frame; a spring to actuate said loop and draw it toward the main frame; a retaining device to hold said loop depressed; a release; a pedal connected to said release and resting on the ground so that it shall release the trap when the ground is disturbed, by the movement of an animal below, for the purpose specified.

6. In a mole trap, the combination of the main frame; a loop projecting below said frame and adapted to be forced into the ground below the trail of the mole; suitable means of actuating said loop; a detaining device on said loop; and a pedal resting on the ground to release said detaining device, when the ground is disturbed by an animal passing below, to throw the loop up against the main frame, for the purpose specified.

In witness whereof I have hereunto set my hand and seal in the presence of two witnesses.

MYRON H. NASH. [L. S.]

Witnesses:
 WALTER S. WOOD,
 MARIAN LONGYEAR.